US009066257B2

(12) United States Patent
Xu et al.

(10) Patent No.: US 9,066,257 B2
(45) Date of Patent: Jun. 23, 2015

(54) CORRELATION BASED CELL SEARCH AND MEASUREMENT FOR LTE AND LTE-A

(75) Inventors: Wen Xu, Neubiberg (DE); Xiaojun Ma, Munich (DE)

(73) Assignee: Intel Mobile Communications GmbH, Neubiberg (DE)

(*) Notice: Subject to any disclaimer, the term of this patent is extended or adjusted under 35 U.S.C. 154(b) by 545 days.

(21) Appl. No.: 13/445,310

(22) Filed: Apr. 12, 2012

(65) Prior Publication Data

US 2013/0273912 A1     Oct. 17, 2013

(51) Int. Cl.
| | |
|---|---|
| *H04W 36/24* | (2009.01) |
| *H04W 24/08* | (2009.01) |
| *H04W 48/16* | (2009.01) |
| *H04W 48/12* | (2009.01) |

(52) U.S. Cl.
CPC .............. *H04W 24/08* (2013.01); *H04W 48/16* (2013.01); *H04W 48/12* (2013.01)

(58) Field of Classification Search
None
See application file for complete search history.

(56) References Cited

U.S. PATENT DOCUMENTS

| | | | | |
|---|---|---|---|---|
| 5,978,413 | A * | 11/1999 | Bender | 375/149 |
| 6,480,558 | B1 * | 11/2002 | Ottosson et al. | 375/350 |
| 7,596,105 | B2 | 9/2009 | Sezgin et al. | |
| 8,509,267 | B2 * | 8/2013 | Kim et al. | 370/503 |
| 8,705,399 | B2 * | 4/2014 | Lo et al. | 370/252 |
| 8,705,436 | B2 * | 4/2014 | Dutta et al. | 370/326 |
| 2010/0069066 | A1 * | 3/2010 | Shen et al. | 455/434 |
| 2010/0291925 | A1 * | 11/2010 | Nagata et al. | 455/434 |
| 2010/0304744 | A1 * | 12/2010 | Hu et al. | 455/434 |
| 2012/0122446 | A1 * | 5/2012 | Malladi et al. | 455/422.1 |
| 2013/0114437 | A1 * | 5/2013 | Yoo et al. | 370/252 |

FOREIGN PATENT DOCUMENTS

EP     2391081 A1     11/2011

OTHER PUBLICATIONS

Moshavi, S.; "Multi-User Detection for DS-CDMA Communications"; IEEE Communications Magazine, 1996, p. 124-136.
3GPP TS 36.211 V8.9.0: 3rd Generation Partnership Project; Technical Specification Group Radio Access Network; Evolved Universal Terrestrial Radio Access; Physical Channels and Modulation; Dec. 2009, p. 1-2, 72-77.
German Office Action dated Jul. 10, 2014 for German Patent Application No. 10 2013 103 462.4, p. 1-16.

(Continued)

*Primary Examiner* — Vladimir Magloire
*Assistant Examiner* — Frank Donado
(74) *Attorney, Agent, or Firm* — Eschweiler & Associates, LLC (57) ABSTRACT

Some aspects of the present disclosure relate to a method for accurately detecting and measuring signals received from multiple cells surrounding a user equipment (UE) during a cell search. The method is performed by receiving a composite signal comprising an aggregate of transmissions (e.g., synchronization signals) from a plurality of base stations at a UE. A correlation-based metric describing a cell is generated by performing a cross-correlation of a transmission (e.g., synchronization signal, reference signal, etc.) from the cell with the received composite signal. The correlation-based metric of weaker cells may be modified to generate an equivalent ideal metric, also proportional to the search criteria, in which the impact of interfering signals is suppressed. By suppressing the impact of the interfering signals, the equivalent ideal metric can be used to identify a weaker target signal in light of the eclipsing, stronger signals.

15 Claims, 7 Drawing Sheets

(56) References Cited

OTHER PUBLICATIONS

Yuan Shen, et al., "Neighboring Cell Search Techniques for LTE Systems", IEEE 2010, p. 1-6.
Qualcomm Incorporated, "3GPP TSG RAN4 #60 bis", Oct. 10-14, 2011 Zhuhai, China p. 1-4.
Brian Katumba, et al., "The LTE Access Procedure", Department of Computer Science and Engineering and Department of Signals and Systems Chalmers University of Technology Gothenburg, Sweden, p. 1-6.
Frank Rayal, "An Overview of the LTE Physical Layer—Part II", Telesystem Innovations, Jun. 20, 2010, p. 1-4.
"UMTS LTE Cell Search", http://www.fullchipdesign.com/tyh/4g_lte_cell_search_synchronization.htm, Mar. 29, 2012, p. 1-2.
"Cell Search and Cell Selection in UMTS LTE", Rohde & Schwarz, Application Note, p. 1-40.

* cited by examiner

CORRELATION BASED CELL SEARCH AND MEASUREMENT FOR LTE AND LTE-A

BACKGROUND

Figure 1A:
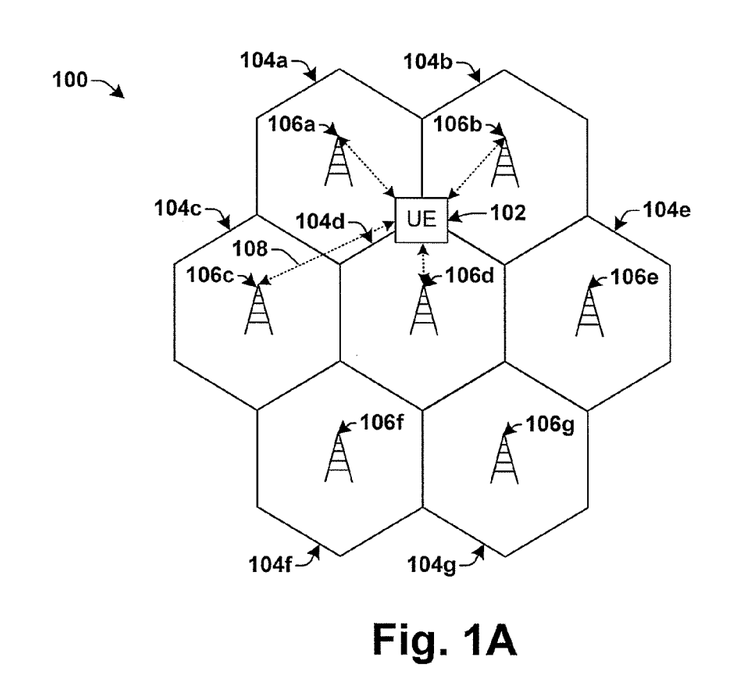
FIG. 1A illustrates an exemplary wireless cellular network comprising a user equipment and a plurality of base stations that act as access points for the user equipment to the network.

Mobile communication networks comprise user equipment (e.g., a cell phone, PDA, etc.) that allows a user to communicate with a network via an access point. FIG. 1A illustrates an exemplary wireless cellular network 100, comprising a user equipment (UE) 102 and a plurality of base stations 106a-106g that act as access points for the UE 102 to the cellular network 100.

In LTE and LTE-A systems, before a UE 102 can start transmitting and/or receiving data it must connect to one of the base stations 106a-106g (e.g., an eNodeB) within the cellular network 100. For example, when UE 102 is first turned on or during a handover from one communication cell to another, UE 102 will perform a cell search to find a suitable base station 106. Usually, multiple cells are identified and/or measured for both an initial cell search (e.g., at call setup) and for intra- or inter-frequency neighbor cell searches for cell selection and/or reselection for handover. As described below, initial cell identification, neighbor cell identification, and cell selection or cell reselection, from a plurality of cells, are referred to as a "cell search".

During the cell search the UE 102 receives signals 108 (e.g., typically based on OFDM) broadcast from a plurality of base stations 106a-106g, respectively located within one or more communication cells 104a-104g, every 5 ms. Based upon the received signal the 102 UE detects a plurality of base stations (e.g., up to 20 or more base stations). Since the UE 102 is associated with a specific operator (e.g., cell phone provider) it is not able to connect with each of the base stations. Rather, after the plurality of base stations are identified, the UE 102 selects one of the base stations broadcasting a strongest signal that allow it to connect.

Figure 1B:
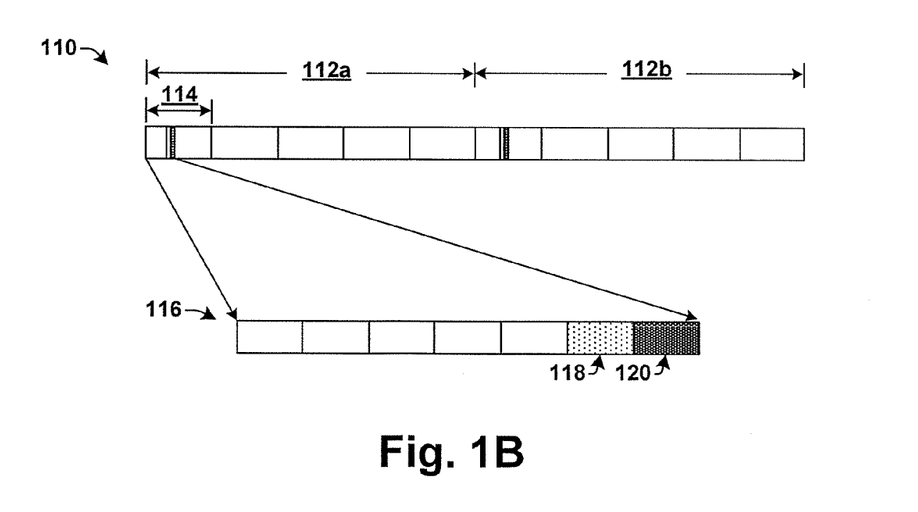
FIG. 1B is an LTE radio frame comprising PSS and SSS symbols.

The signals 108 comprise primary synchronization signal (PSS) and secondary synchronization signal (SSS). For OFDM based LTE/LTE-A, a signal can be, for example, an OFDM symbol in time domain or in frequency domain. FIG. 1B illustrates an exemplary radio frame 110 for an LTE system. As shown in FIG. 1 B, the radio frame 110 comprises a first half frame 112a and a second half frame 112b. Each half frame 112 comprises five sub-frames 114, each of which is broken into two slots 116. For LTE FDD, PSS symbols 120 are located in the last OFDM symbols of the first and $11^{th}$ slot of each radio frame 110, while SSS symbols 118 immediately precede the PSS symbols 120. The PSS symbols 120 can provide for synchronization between a base station and UE, while SSS symbols 118 provide a UE with a cell group identity, a physical layer identity within a cell group, the CP length, etc.

DETAILED DESCRIPTION

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

During a downlink phase of a cell search in LTE and LTE-A systems, a user equipment (UE) that is surrounded by a plurality of base stations (e.g., eNodeBs) will receive a composite signal comprising signals broadcast from each of the plurality of base stations. The signal broadcast from each base station comprises a different combination of primary synchronization signal (PSS) and secondary synchronization signal (SSS), which are received by a UE and used to identify the different base stations. The UE will find a subset of the plurality of base stations that outputs the strongest signals and then try to connect to a strongest base station that will allow it to connect.

Because frequencies can be re-used in a cellular network, a UE can receive synchronization signals from more than one base station on a same frequency. Multiple signals received on a same frequency are often time synchronized or quasi-synchronized such that the synchronization signals collide in time.

Figure 2:
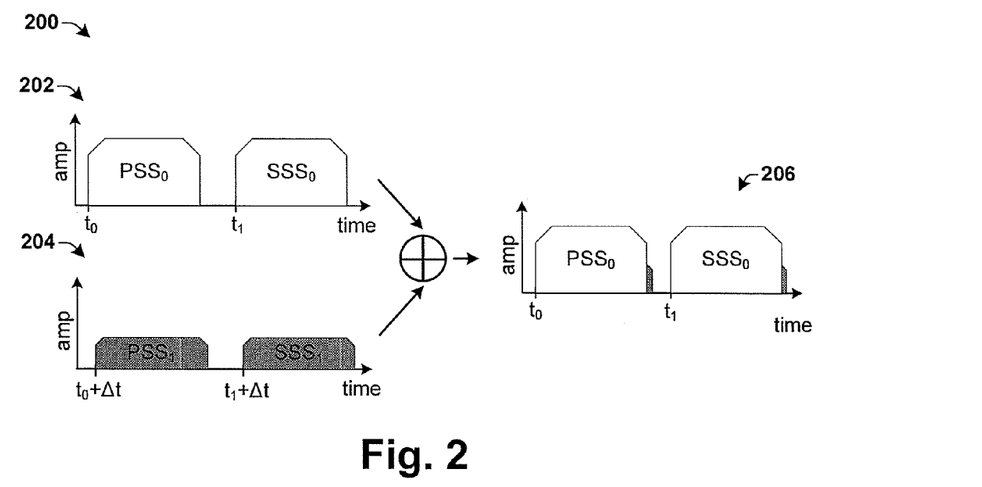
FIG. 2 illustrates timing diagrams showing synchronization signals in a frame output by a first base station and a second base station.

For example, FIG. 2 illustrates timing diagrams 200 showing synchronization signals transmitted by signals, 202 and 204, respectively broadcast by base stations in first and second cells. The signal 202 that broadcasts synchronization signals $SSS_0$ and $PSS_0$ from the first cell has a greater strength than a signal 204 that broadcasts synchronization signals $SSS_1$ and $PSS_1$ from the second cell. Therefore, when synchronization signals from the first and second cells overlap in time (e.g., are quasi-synchronized) a composite signal 206 is received at a UE having synchronization signals from the weaker, second cell $PSS_1$ and $SSS_1$ that are "eclipsed" by synchronization signals of the interfering, first cell $PSS_0$ and $SSS_0$. This makes the synchronization signals $PSS_1$ and $SSS_1$ from the weaker, second cell difficult to detect.

Similarly, when cell-specific reference signals (CRSs) received from the first and second cells overlap in time and frequency (i.e., are quasi-synchronized) it may become difficult to accurately measure the signal strength or energy of the "eclipsed" weaker cell (i.e. the second cell) by using the CRS.

Accordingly, the present invention relates to a method and apparatus for accurately detecting and measuring signals received from multiple cells surrounding a UE during a cell search and/or measurement. The method is able to detect both strong, interferer signals and weaker, target signals eclipsed by the strong signals, or to detect weaker, target signals when a stronger, interferer is known. In some embodiments, the method comprises receiving a composite signal comprising an aggregate of transmissions (e.g., synchronization signal, cell-specific reference signal) broadcast from a plurality of base stations. Correlation-based metrics, proportional to a search criterion, are generated by performing a cross-correlation of transmissions (e.g., synchronization signal or reference signals) of an interfering cell and a target cell. An equivalent ideal metric of a weaker, target cell is obtained by modifying a correlation-based metric of the target cell according to the cross-correlation between the interferer cell and the target cell and/or the signal power of the interferer cell(s). The impact of the interferer cell is suppressed within the equivalent ideal metric, allowing it to be used to identify a weaker, target signal.

Figure 3:
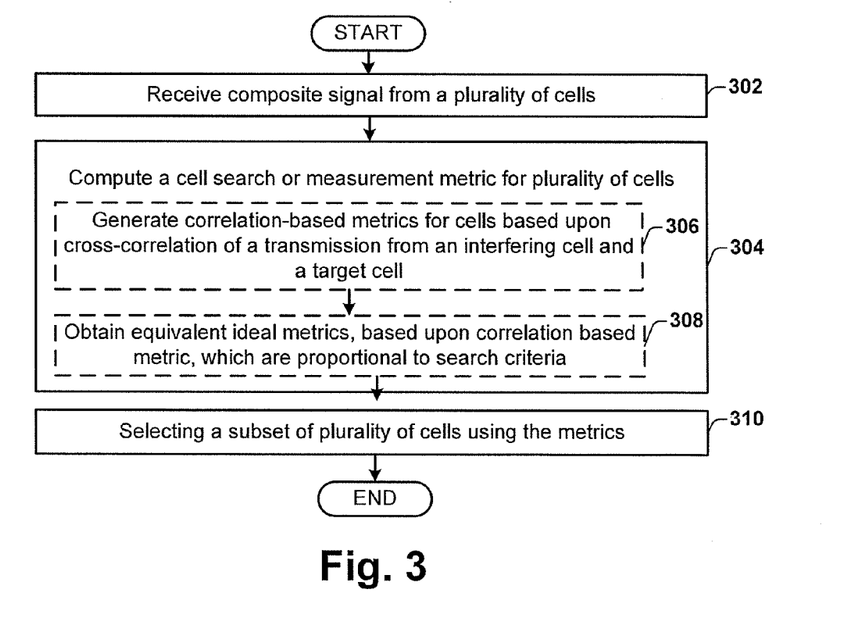
FIG. 3 is a flow diagram illustrating a method for performing a cell search and measurement.

FIG. 3 illustrates a method 300 for detecting and measuring signals received from multiple cells surrounding a user equipment during a cell search.

At 302 a composite signal is received from a plurality of cells surrounding a user equipment (UE). The composite signal comprises an aggregate of transmissions (e.g., PSS, SSS, CRS, PBCH, etc.) output by a plurality of base stations. In some embodiments, the composite signal comprises an aggregate of synchronization signals broadcast by a plurality of base stations, wherein the synchronization signals broadcast by each base station define a cell identity of that base station.

At 304 a cell search or measurement metric is computed. In various embodiments, the cell search metric or cell measurement metric my be computed for a target cell based upon a cross-correlation between transmissions from the interferer cell and the target cell, or upon the power of the interferer cell, or upon a power ratio of the interferer cell and the target cell. Furthermore, It will be appreciated that cross-correlation can be generated between transmission comprising any reference signal, wherein a "reference signal" is generally referred to as a predefined signal.

In some embodiments, the cell search metric may be computed by forming a correlation-based metrics and/or equivalent based metrics. For example, at 306 correlation-based metrics proportional to a search criterion are generated for the plurality of cells is generated. The search criterion comprises a criterion upon which a subset of the cells are detected. In some embodiments, wherein the transmission comprises a SSS (secondary synchronization signal), the search criterion may comprise a maximum power contribution of the received synchronization symbols (SCH_RP) (i.e., a received linear average power of resource elements that carry synchronization signals). In other embodiments, the search criteria may comprise the reference signal received power/quality (RSRP/RSRQ) as defined in 3 GPP, for example.

At 308 one or more equivalent ideal metrics proportional to the search criteria are obtained based upon the correlation-based metrics. The equivalent ideal metric is obtained by modifying the correlation-based metric. By modifying the correlation-based metric of a cell to be detected, the impact of an interferer cell can be suppressed and the resulting equivalent ideal correlation metric becomes equivalent to the search criteria.

For example, the equivalent ideal metric of a strong, interferer cell may be obtained by setting the equivalent ideal metric equal to the correlation-based metric of the cell, since the interferer cell has a power that is greater than the weaker cell causing the correlation-based metric to be equivalent to the search criteria. The equivalent ideal metric of a weaker, target cell is obtained by modifying a correlation-based metric of the target cell according to the cross-correlation between the interferer cell and the target cell and/or the signal power of the (strong) interferer cell(s). Such a modification suppresses the impact of the interferer signal, resulting in an equivalent ideal correlation metric that is equivalent to the search criteria.

In some embodiments, wherein the transmissions comprise synchronization signals, the equivalent ideal correlation-based metric is dependent on the cross-correlation between synchronization signals of interfering and targeting cells. In other embodiments, wherein the transmissions comprise cell-specific reference signal (CRS), the equivalent ideal correlation-based metric is dependent on the cross-correlation between CRS of interfering and targeting cells. In some embodiments, wherein a correlation-based metric is generated for a target cell based upon a cross-correlation of the received composite signal with a synchronization signal received from the target cell, the acquisition of the corresponding equivalent ideal cross-correlation metric will result in a cross-correlation between synchronization signals and/or CRSs of interfering and target cells.

At 310 a subset of the plurality of cells are selected using the metrics. In some embodiments, the correlation-based metrics and/or equivalent ideal metrics of candidate cells are used to select a subset of cells having the "strongest" signals according to the search criteria (e.g., the signals with the highest search criteria). Since the correlation-based metric and/or the equivalent ideal metric are proportional to the search criteria, they can be compared to one another to determine the strongest cells with distinct cell IDs (e.g., the cells with the highest power). In some embodiments, the equivalent ideal metrics of the different cells are compared to one another or to correlation-based metrics, such that the metrics having the largest values (i.e., the strongest power) determine the strongest signals.

Figure 4:
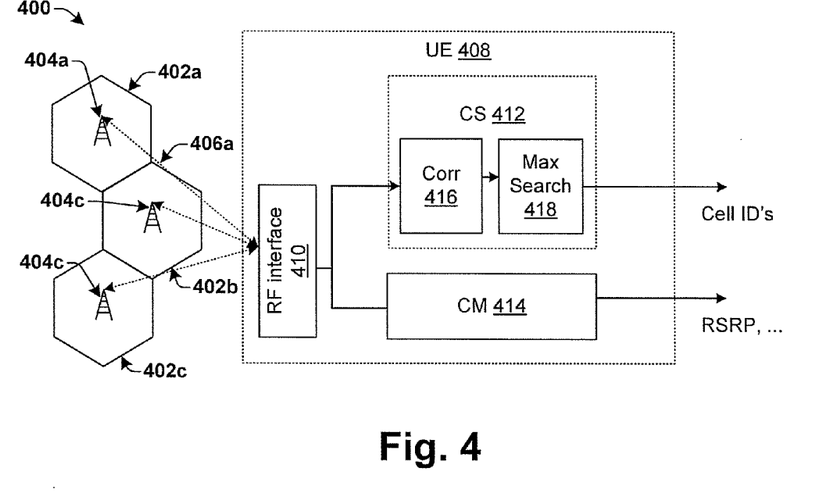
FIG. 4 is a block diagram of a cell search apparatus.

FIG. 4 illustrates a block diagram of wireless communication system 400 comprising a UE 408 configured to implement a disclosed cell search and measurement method in which cross-correlation is exploited.

The wireless communication system 400 comprises a user equipment (UE) 408 in communication with cellular network having a plurality of cells 402a-402c. Each of the plurality of cells 402a-404c comprises a base station 404a-404c (e.g., an eNodeB) configured to broadcast signals 406a-406c comprising one or more transmissions (e.g., synchronization signals, PCBH, etc.).

The UE 408 is configured to perform a cell measurement of a target cell that is coincident in time with an interferer cell. The cell measurement may be of a reference signal received power (RSRP) or reference signal received quality (RSRQ), whereby the measurement is dependent on cross-correlation between reference signals of interfering and targeting cells.

In some embodiments, the UE 408 comprises an RF interface 410 configured to receive a composite signal comprising an aggregate of transmissions output by the plurality of base stations 404a-404c. The RF interface 410 is configured to provide the received composite signal to a cell search (CS)

element 412 and a cell measurement (CM) element 414. Based upon the received signals, the CS 412 is configured to find the cell IDs (together with their timing, carrier frequency offset, etc.) of a subset of detected cells around the UE 408. Once the cell ID's of the detected cells are available, the CM element 414 is configured to detect the strength (e.g., RSRP and RSRQ) of the detected cells, so that the UE 406 can be connected to the one of the strongest of the available cells. In some embodiments, the CS element 412 and CM element 414 may comprise separate processors, such that the UE 406 comprises a first cell search processor and a second cell measurement processor.

In some embodiments, the CS 412 comprises a correlation element 416 having an input node coupled to the RF interface 410. The correlation element 416 is configured to perform a cross-correlation between transmissions of interfering and targeting cells. For example, in some embodiments the correlation element 416 is configured to perform a cross-correlation between a received transmission and the received composite signal, and to generate a correlation-based metric therefrom. The correlation-based metric is proportional to a search criterion.

The correlation element 416 is further configured to generate one or more equivalent ideal metrics, proportional to a search criterion, if the received composite signal comprises a target and interferer signal that collide in time. The equivalent ideal metric of a target cell is generated by modifying the correlation-based metric of the cell according to a cross-correlation between an interferer cell and the cell to be detected and/or according to the signal power of the interferer cell(s). Modifying the correlation-based metric results in an equivalent ideal metric that suppresses the impact of the interferer cell, such that the equivalent ideal metric can be used to detect a target signal.

The metrics (i.e., correlation-based metric and/or the equivalent ideal metrics) are provided to a first logic element 418 configured to perform a maximum search on the metrics to determine a subset of cells outputting the signals having the strongest signals, according to the search criteria. For example, a maximum search is performed for transmission signals comprise SSS to determine a subset of cells broadcasting signals with the largest SCH_RP. In various embodiments, the maximum search may comprise a search between cross-correlation metrics, equivalent ideal metrics, or a combination thereof.

Figures 5A, 5B:
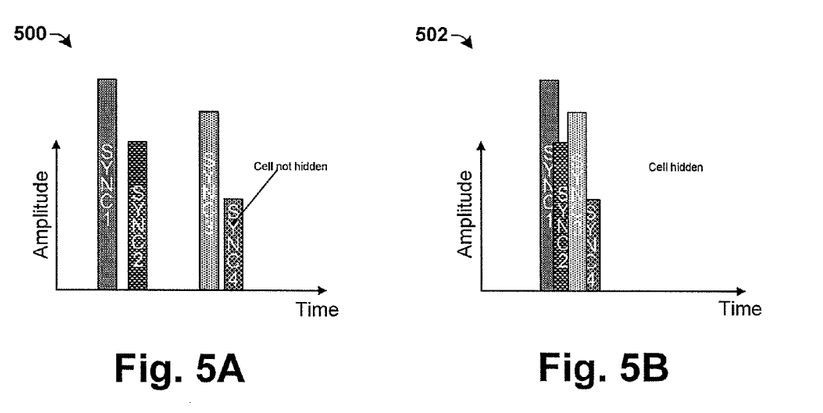
FIGS. 5A-5C illustrates graphs showing various network scenarios that the disclosed apparatus and method are able to support.
Figure 5C:
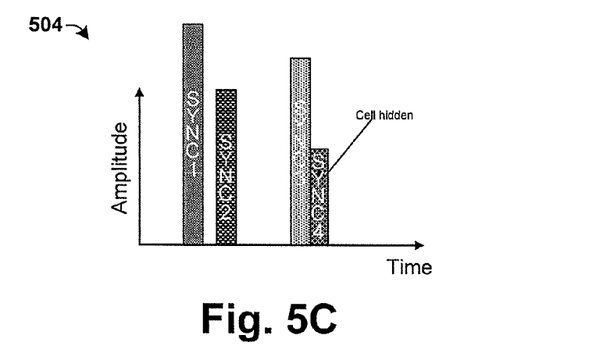

The disclosed apparatus and method for performing a correlation-based cell search and/or measurement can support a plurality of different network scenarios. FIGS. 5A-5C illustrates graphs 500, 502, and 504 showing various network scenarios that the disclosed apparatus and method are able to support. The graphs 500, 502, and 504 show synchronization signals received at a UE as a function of time (x-axis) and amplitude (y-axis).

In particular, graphs 500-504 illustrate four synchronization signals SYNC1-SYNC4, respectively broadcast by four cells. A user equipment receives the first synchronization signal SYNC1 from a first cell at a first time, the second synchronization signal SYNC2 from a second cell at a second time, the third synchronization signal SYNC3 from a third cell at a third time, and the fourth synchronization signal SYNC4 from a fourth cell at a fourth time. Furthermore, the fourth synchronization signal SYNC4 has smaller amplitude than the first through third synchronization signals SYNC1-SYNC3.

Referring to FIG. 5A, during asynchronous operation, the fourth synchronization signal SYNC4 is distinct in time from other synchronization signals and therefore is not hidden. Therefore, the fourth synchronization signal SYNC4 can be detected by use of a correlation-based metric of the fourth cell, which is proportional to a search criterion, without having to suppress the influence of an interferer signal.

Referring to FIG. 5B, during synchronous operation, the fourth synchronization signal SYNC4 is quasi-synchronous in time with the third synchronization signal SYNC3. Therefore, the fourth synchronization signal SYNC4 can be detected by use of an equivalent ideal metric of the fourth cell, which suppresses the influence of an interferer signal that conveys the third synchronization signal SYNC3.

Referring to FIG. 5C, during a partly synchronous operation, the fourth synchronization signal SYNC4 may or may not collide in time with the third synchronization signal SYNC3. Once again, the fourth synchronization signal SYNC4 can be detected by use of an equivalent ideal metric of the fourth cell, which suppresses the influence of an interferer signal that conveys the third synchronization signal SYNC3.

Figure 6:
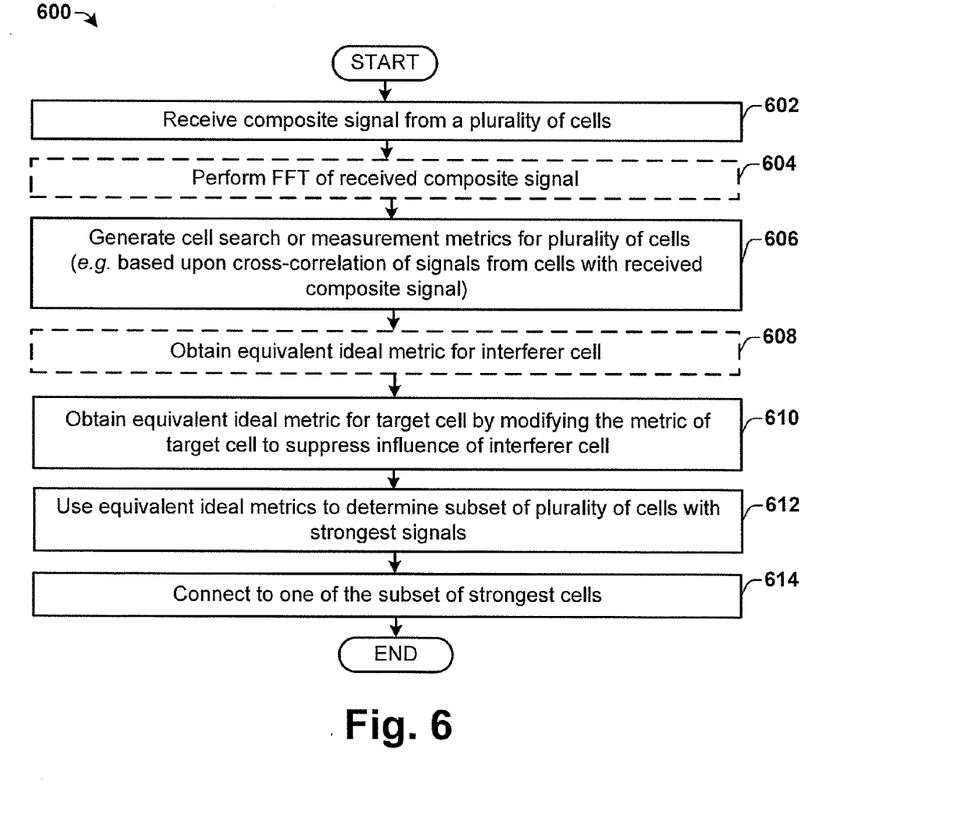
FIG. 6 is a flow diagram illustrating a method of performing a cell search and measurement in which cross-correlation of synchronization signals is exploited.

FIG. 6 illustrates a method 600 of performing a cell search and/or measurement in which cross-correlation of synchronization signals is exploited. It will be appreciated that as described herein, and when not explicitly stated, a synchronization signal can refer to an OFDM symbol in either the time domain or in the frequency domain.

At 602 a composite signal is received from a plurality of cells surrounding a user equipment (UE). The composite signal comprises synchronization signals broadcast from a plurality of base stations surrounding the UE. The synchronization signals received from each of the base stations define a cell identity of that base station. In some embodiments, the composite signal comprises an interferer signal configured to convey a first synchronization signal and a weaker, target signal configured to convey a second synchronization signal that collides in time with the first synchronization signal.

In some embodiments, wherein the method is configured to search for an SSS, a Fourier transform is performed onto the received composite signal at 604. The Fourier transform converts the received composite signal from the time domain to the frequency domain.

At 606 cell search and/or measurement metrics are generated for a plurality of cells. The cell search and/or measurement metrics are generated based upon a cross-correlation of signals from cells (e.g., PSS, SSS) with a received composite signal. In some embodiments, the cell search metric may comprise a correlation-based metric, proportional to a search criterion, is generated for the plurality of surrounding cells. In some embodiments, a correlation-based metric of a cell is generated based upon a cross-correlation of the received composite signal with a synchronization signal received from the cell. In the case of a target cell, taking a cross-correlation of a received composite signal with a synchronization signal received from the target cell will result in a correlation-based metric that is proportional to a cross-correlation between synchronization signals of interferer and target cells.

At 608 an equivalent ideal metric, proportional to the search criteria, may be obtained for the interferer cell. The equivalent ideal metric for the interferer cell is obtained from the correlation-based metric. If the strength of the interferer cell is much greater than the target cell, the equivalent ideal metric of the interferer is equal to the correlation-based metric.

At 610 an equivalent ideal metric, proportional to the search criteria, is obtained for the target cell. The equivalent ideal metric for the target cell is obtained by modifying the metric of the target cell to suppress the influence of the interferer signal. In some embodiments, the influence of the interferer signal is suppressed by subtracting an interferer signal component of from the correlation-based metric of the target cell. In other embodiments, the influence of the interferer signal is suppressed by multiplying the correlation-based metric of the target cell by a weighting factor. By suppressing the influence of the interferer signal within the correlation-based metric of the target cell, the correlation-based metric of the target cell can be used to directly detect the target cell.

At 612 the equivalent ideal metrics are used to identify a subset of the plurality of cells with strongest signals, according to the search criteria. In some embodiments, since the equivalent ideal metric is proportional to the search criteria, the ideal metric of a candidate cell is compared to the ideal metric of other cells to determine M strongest cells surrounding a user equipment.

At 614 a user equipment is connected to one of the subset of the plurality of cells with strongest signals.

Figure 7:
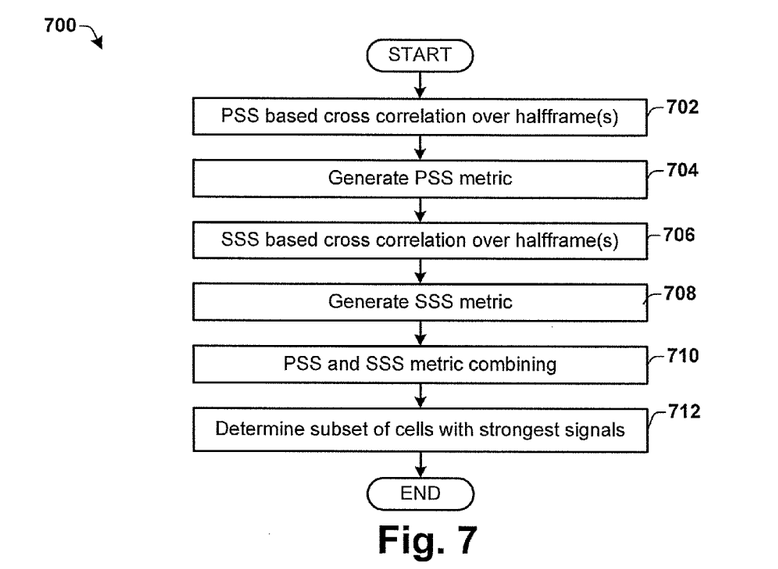
FIG. 7 is a flow diagram illustrating a method of performing a cell search using PSS and SSS.

It will be appreciated that the disclosed method may be applied to perform a cell search by exploiting cross-correlation of primary and secondary synchronization signals. In some embodiments, the cell search can be performed based upon a combination of results obtained from the detected PSS and SSS. FIG. 7 is a flow diagram 700 illustrating a method of performing a cell search using PSS and SSS.

At 702 a cell search is performed in which cross-correlation of a primary synchronization signal (PSS) is exploited. The cell search is performed by generating metrics for PSS using cross-correlation, and identifying a subset of cells with the strongest signals is based upon the metrics. In some embodiments, the cell search is performed over a half frame (comprising a single PSS received in the first slot of a radio frame) or over a radio frame (comprising two SSS).

At 704 the results of PSS based cross-correlation cell search are combined to generate a PSS metric. For example, within a radio frame, there are two PSSs representing the same cell. When they are available, a first PSS detected during a first half frame of a radio frame can be combined with subsequent PSSs detected during subsequent half frames. Combining the results of PSS cell searches performed over a plurality of half frames provides for better results to the cell search.

At 706 a cell search is performed in which cross-correlation of a secondary synchronization signal (SSS) is exploited. The cell search is performed by generating metrics for SSS using cross-correlation, and identifying a subset of cells with the strongest signals is based upon the metrics. In some embodiments, the cell search is performed over a half frame (comprising a single SSS received in the first slot of a radio frame) or over a radio frame (comprising two SSS).

At 708 the results of SSS based cross-correlation cell searches are combined to generate a SSS metric. For example, within a radio frame, there are two distinct SSS s representing the same cell. When they are available, a first SSS detected during a first half frame of a radio frame can be combined with subsequent SSSs detected during subsequent half frames. Combining the results of SSS cell searches performed over a plurality of half frames provides for better results to the cell search.

At 710 the results of the PSS metric and the SSS metric are combined. By combining the PSS and SSS metrics the results of the PSS and SSS cell searches are combined.

At 712 a subset of the strongest cell is selected based upon the combined results of the PSS and SSS cell search.

Figure 8:
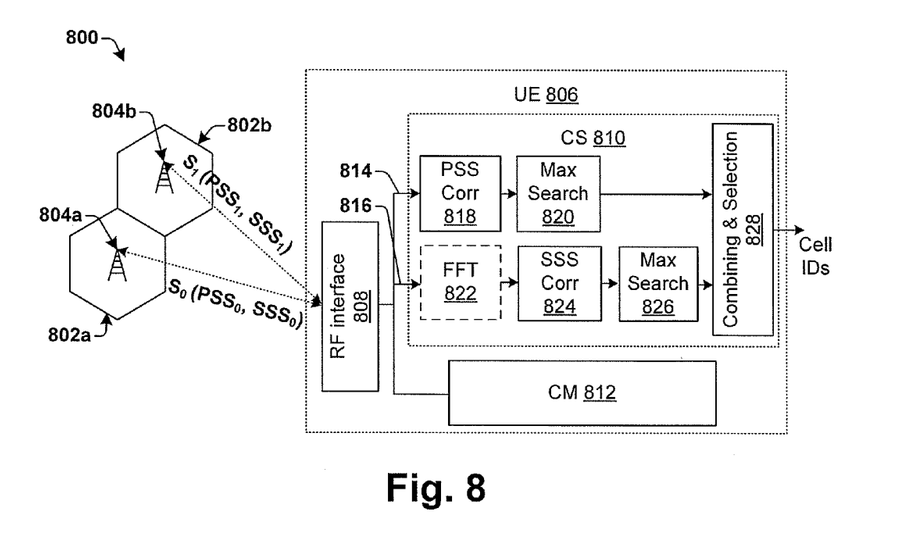
FIG. 8 is a block diagram of a wireless communication network comprising a user equipment configured to perform a disclosed cell search in which the cross-correlation of synchronization signals is exploited.

FIG. 8 is a block diagram of a wireless communication network 800 comprising a user equipment 806 configured to perform a cell search in which the cross-correlation of synchronization signals is exploited.

The wireless communication network 800 comprises a first base station 804a within a first cell 802a, and a second base station 804b within a second cell 802b. The first base station 804a is configured to broadcast a first signal $S_0$ that having a first primary synchronization signal $PSS_0$ and a first secondary synchronization signal $SSS_0$. The second base station 804b is configured to broadcast a second signal $S_1$ that having a second primary synchronization signal $PSS_1$ and a second secondary synchronization signal $SSS_1$.

The UE 806 comprises an RF interface 808 configured to receive a composite signal comprising an aggregate of the synchronization signals output by the plurality of base stations 804a-804b. The RF interface 808 is configured to provide the received composite signal to a cell search (CS) element 810 and a cell measurement (CM) element 812. The CS 810 is configured to find the cell ID of available cells around the UE 806. Once the cell ID's of the detected cells are available the CM element 812 is configured to detect the RSRP and/or RSRQ of the detected cells, such that the strongest of the available cells are selected.

In some embodiments, the CS element 810 comprises a first CS path 814 and a second CS path 816. The first CS path 814 comprises a PSS correlation element 818 having an input node coupled to the RF interface 808. The PSS correlation element 818 is configured to generate a correlation-based metric proportional to a search criterion by performing a cross-correlation between PSS (e.g., $PSS_0$ or $PSS_1$) and the received composite signal within the time domain. Such a cross-correlation between PSS from a target cell and the received composite signal results in a cross-correlation between PSS of interfering and targeting cells, since the received composite signal comprises the interferer signal.

The PSS correlation element 818 is further configured to generate one or more equivalent ideal metrics, proportional to the search criteria, if the target and interferer signals collide in time. The equivalent ideal metric of a target cell is generated by modifying the correlation-based metric of the cell according to a cross-correlation between an interferer cell and the cell to be detected and/or according to the signal power of the interferer cell(s). Modifying the correlation-based metric results in an equivalent ideal metric that suppresses the impact of the interferer cell. The metrics are then provided to a first logic element 820 connected to an output node of the PSS correlation element 818. The first logic element 820 is configured to perform a maximum search on the metrics to determine a first subset of cells broadcasting PSS with the strongest signals, according to the search criteria In some embodiments, the second CS path 816 may comprise a FFT element 822 having an input node coupled to the RF interface 808. The FFT element 822 is configured to perform a fast Fourier transform that converts the received composite signal from the time domain to the frequency domain. The received composite signal is then provided to a SSS correlation element 824 configured to generate a correlation-based metric proportional to a search criterion by performing a cross-correlation between SSS (e.g., $SSS_0$ or $SSS_1$) and the received composite signal within the time domain. Such a cross-correlation between SSS from a target cell and the received composite signal results in a cross-correlation between SSS of interfering and targeting cells, since the received composite signal comprises the interferer signal.

The SSS correlation element 824 is further configured to generate one or more equivalent ideal metrics, proportional to the search criteria, if the target and interferer signals collide in time. The equivalent ideal metric of a target cell is generated by modifying the correlation-based metric of the cell according to a cross-correlation between an interferer cell and the cell to be detected and/or according to the signal power of the interferer cell(s). Modifying the correlation-based metric results in an equivalent ideal metric that suppresses the impact of the interferer cell. The metrics are then provided to a second logic element 826 connected to an output node of the SSS correlation element 824. The second logic element 826 is configured to perform a maximum search on the metrics to determine a second subset of cells broadcasting SSS with the strongest signals, according to the search criteria.

A combining and selection unit 828 is configured to receive the first and second subsets, respectively determined by the PSS and SSS maximum searches, from the first logic element 820 and the second logic element 826 and to generate cell ID's of a subset of cells having the strongest signals therefrom. Combining the PSS and SSS cross-correlation based detection provides for better results to the cell search.

Figure 9:
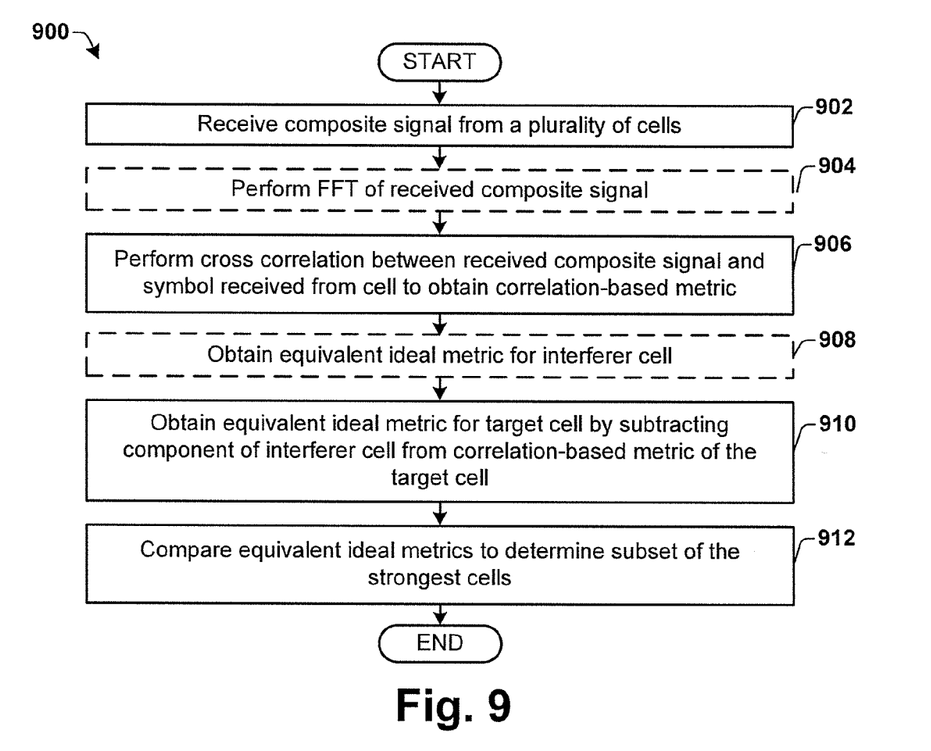
FIG. 9 is a flow diagram illustrating a more detailed embodiment of a method of performing a cell search in which cross-correlation of secondary synchronization signals is exploited.
Figure 10:
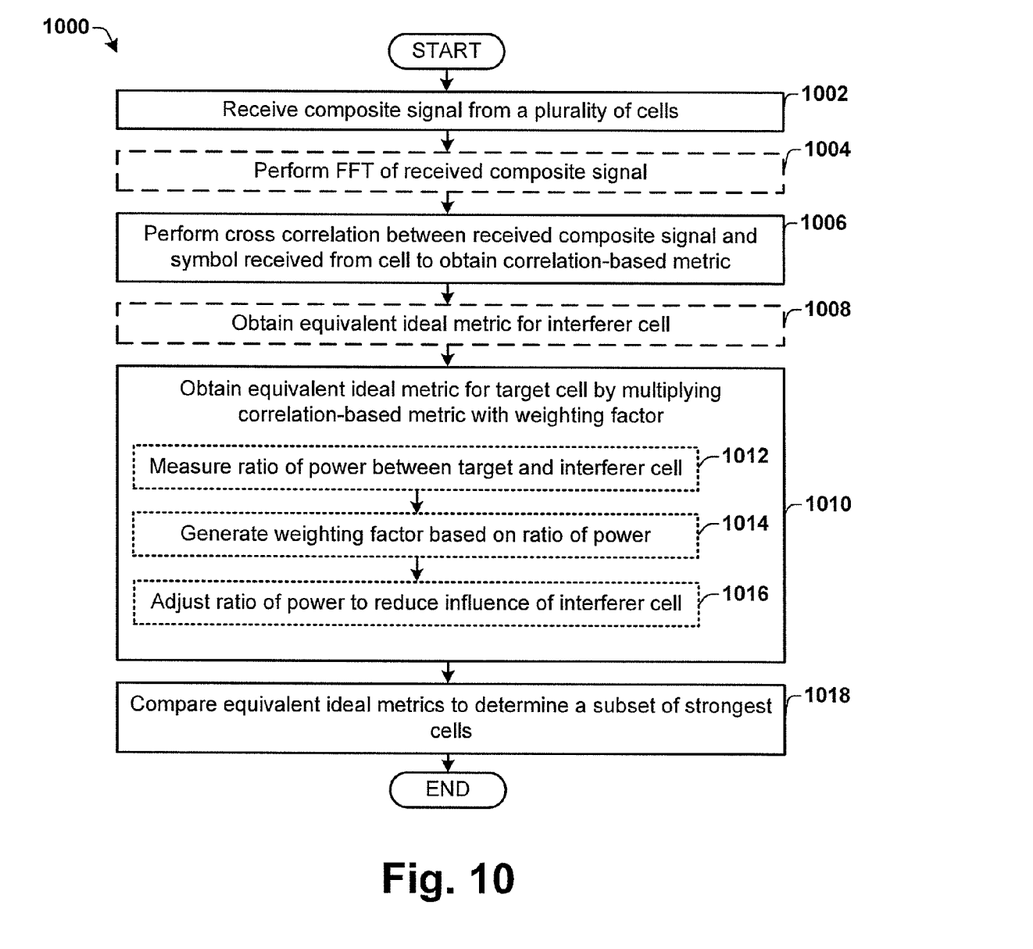
FIG. 10 is a flow diagram illustrating an alternative embodiment of a method of performing a cell search in which cross-correlation of secondary synchronization signals is exploited.

FIGS. 9-10 illustrate more particular examples of methods of cell detection and measurement in which cross-correlation of SSS is exploited. The examples set forth in FIGS. 8-9 are non-limiting examples that apply the disclosed methods to a system having two cells, a strong, interferer cell and a weak, target cell that is to be detected. The interferer cell is configured to broadcast a first signal $S_0$ (with a flat fading channel that is invariant over frequencies) comprising a radio frame having a first synchronization signal $SSS_0$. The target cell is configured to broadcast a second signal $S_1$ (with a flat fading channel that is invariant over frequencies) comprising a radio frame having a second synchronization signal $SSS_1$. The first and second synchronization signals, $SSS_0$ and $SSS_1$, are synchronous in time, so that $SSS_0$ eclipses $SSS_1$. It will be appreciated that the disclosed method is not limited to such systems, but instead may be applied to systems having more than two cells and for general channels such as ETU, EVA, etc.

FIG. 9 is a flow diagram illustrating a more detailed embodiment of a method 900 of performing a cell search in which cross-correlation of secondary synchronization signals is exploited.

At 902 a composite signal is received from a plurality of base stations surrounding a user equipment. The composite signal comprises SSS from the plurality of base stations that define a cell identity of that base station. The composite received time domain SSS is equal to:

$$r(n) = \sum_{m \in \mathcal{N}_T} \sum_{l=0}^{L_m-1} h_m(l) s_m(n - \tau_m - l) + z(n)$$

where $s_m$ is a transmitted time domain SSS signal, $h_m(l)$ is the channel impulse response ($L_m$=maximum channel delay spread), $\tau_m$ is a delay, m is the cell index, $N_T$ is the total number of cells (e.g., in LTE the total number of cells surrounding a UE is 504), and $z(n)$ is noise associated with a complex AWGN process. Note that the above equation is valid not only for SSS, but also for PSS, CRS, etc, as well as the combination thereof.

At 904 a Fourier transform may be performed on the received composite signal. The Fourier transform converts the received composite signal from the time domain to the frequency domain. In the frequency domain, the received composite signal extends over 62 subcarriers, with each subcarrier having an element in the frequency domain. The received composite signal in the frequency domain is equal to:

$$R(k) = \sum_{m \in \mathcal{N}_T} H_m(k) S_m(k) e^{-j\frac{2\pi \tau_m k}{N}} + Z(k)$$

where $R(k)$, $S_m(k)$, $H_m(k)$ and $Z(k)$ are the N-point DFT of $r(n)$, $s_m(n)$, $h_m(n)$, and $z(n)$. The index $k \in \mathcal{K}$ and $Z(k) \sim \mathcal{CN}(0, \sigma_z^2)$. For one SSS symbol, $\mathcal{K} = \{-31, \ldots, -1, 1, \ldots, 31\}$, and the number of the considered subcarriers $K := |\mathcal{K}| = 62$.

At 906 correlation-based metrics are generated based upon a cross-correlation of the received composite signal with signals received from the cells. A correlation-based metric $\Lambda_m$ of a cell is equal to the expectation (the statistical average over a number of measurements) of the correlation between a secondary synchronization signal $S_m'$ and the received composite signal R. For example, $$\Lambda_1 := E\{|\text{corr}\{S_1', R\}|^2\}$$
$$= P_0|\text{corr}\{S_1', S_0'\}|^2 + P_1 K^2 + \sigma_z^2 K, \text{ and}$$
$$\Lambda_0 := E\{|\text{corr}\{S_0', R\}|^2\}$$
$$= P_1|\text{corr}\{S_0', S_1'\}|^2 + P_0 K^2 + \sigma_z^2 K.$$

wherein $E\{|\text{corr}\{S_1', R\}|^2\}$ is the statistical average of the correlation between $S_1'$ and R and $\sigma_z^2$ is the noise at UE, $S_0'$ is the frequency domain SSS (assumed to be invariant over considered subcarriers) of the first cell and $S_1'$ is the frequency domain SSS of the second cell (assumed to be invariant over subcarriers) and $P_m := E\{|H_m|^2\}$ is the UE received power from the cell m. A cross-correlation between signal A and B is a measurement of similarity between the signal A and B. It can e.g. be defined as $$\text{corr}\{A, B\} := \sum_k A^*(k) B(k).$$

For simplicity, we denote S $$m'(k) := S_m(k) e^{-j\frac{2\pi \tau_m k}{N}}.$$

Although method 900 is described in regards to a metric corresponding to the SCH_RP, which is based on a synchronization signal, it will be appreciated that the disclosed method 900 can be extended to other metrics based on any reference signal, such as RSRP and/or RSRQ based on the cell-specific reference signal (CRS), etc, wherein a "reference signal" is generally referred to as a predefined signal. For example, in addition to RSRP, other metrics (measurements) like the RSRQ (reference signal received quality) can also used in LTE/LTE-A as criteria for cell identification, measurement and (re)selection. RSRQ is defined as the ratio of RSRP and RSSI (received signal strength indicator), where the RSSI is defined as the linear average of the total received power observed in OFDM symbols containing reference symbols. Mathematically, the RSSI is equal to $E\{|R|^2\}$ when transmit signal is CRS, where $E\{.\}$ denotes the expectation. When a transmitted signal is the synchronization signal, $E\{|R|^2\}$ is referred here as the SCH_SI (received synchronization signal strength indicator).

Similarly, although described in regards to an SSS, it will be appreciated that the above equation is valid for any input signal $S_m(k)$, such as PSS, and/or SSS, and/or CRS (cell-specific reference signal), etc. In terms of 3GPP LTE, when the transmit signal is the CRS, $P_m$ is the so-called reference signal received power (RSRP) which is defined as the linear average over the power contributions of the resource elements that carry cell-specific reference signals. When the transmit signal is the synchronization signal (PSS and SSS), $P_m$ is called the synchronization signal received power (SCH_RP) which is defined as the received linear average power of the resource elements that carry synchronization signal. In other words, a cell search based on synchronization signal is performed by finding the M cells having the maximal SCH_RP, while a cell search based on CRS is performed by finding the M cells having the maximal RSRP.

At 908 an equivalent ideal metric may be obtained for the interferer cell. The equivalent ideal metric is proportional to a search criteria $P_m$ comprising a received synchronization signal(SCH_RP)(i.e., the linear average over the power contribution of the resource elements that carry cell-specific reference signals. Since the stronger signal is from cell 0 (i.e., $P_0 > P_1$), $\Lambda_0 > \Lambda_1$ and the stronger cell 0 can be easily detected using the direct correlation-based metric (without any modification). Therefore, the equivalent ideal metric of the stronger cell is equal to:

$$\Lambda'_0 := P_0 K^2 + \sigma_z^2 K \approx \Lambda_0.$$

At 910 an equivalent ideal metric is obtained for the target cell. To obtain the equivalent ideal metric of the target cell, the correlation-based metric is modified by subtracting the signal power of the interferer cell from the correlation metric of the received signal. Therefore, the equivalent ideal metric of the target cell is equal to:

$$\Lambda'_1 := P_1 K^2 + \sigma_z^2 K = \Lambda_1 - P_0 K^2 |\rho_{S_1',S_0'}|^2$$

where K is a constant and $\rho$ is the cross-correlation coefficient, which is equal to:

$$\rho_{S_m',S_n'} := \frac{\text{corr}\{S_m',S_n'\}}{\text{corr}\{S_m',S_m'\}} = \text{corr}\{S_m',S_n'\}/K.$$

By subtracting out the signal power of the interferer cells, the correlation metric of the weaker signal can be used to directly detect the target cell.

At 912 the equivalent ideal metrics are used to identify a subset of the plurality of cells with strongest signals. Since the equivalent idea metrics are proportional to the search criteria $P_m$, the subset of cells can be identified according to a search rule that the subset comprise a cell m is within the subset $N_M$ if $E\{|\text{corr}\{S_m',R\}|^2\} > E\{|\text{corr}\{S_n',R\}|^2\}$ for available cells (i.e., if $P_m > P_n$).

FIG. 10 is a flow diagram illustrating an alternative embodiment of a method 1000 of performing a cell search in which cross-correlation of secondary synchronization signals is exploited. Steps 1002-1008 and 1012 are the same as steps 902-908 and 912, described above in method 900. Step 1010 is described below.

At 1010 an equivalent ideal metric is obtained for the target cell. To obtain the equivalent ideal metric of the target cell, the correlation-based metric is modified by multiplying the correlation-based metric by a weighting factor that suppresses the influence of the interferer signal. In some embodiments, the weighting factor is inversely proportional to the ratio of the synchronization signal received power of the interferer signal to the synchronization signal received power of the target signal (i.e., is proportional to a cross-correlation between an interfering cell and the cell to be detected).

In some embodiments, the ideal metric may be obtained by measuring a ratio of power between a target and interferer cells (1012) and generating a weighting factor based thereupon (1014). In some embodiments, the weighting factor may be tuned by adjusting the ratio of power to reduce the influence of the interferer cell (1016). For example, an equivalent ideal metric of the target cell may be equal to:

$$\Lambda'_1 \approx \frac{1}{1 + |\rho_{S_0',S_1'}|^2 P_0/P_1} \Lambda_1 = \beta^2 \Lambda_1$$

where $\beta^2$ is the weighting factor, and is equal to $$\beta^2 := \frac{1}{1 + |\rho_{S_0',S_1'}|^2 P_0/P_1}$$

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A non-transitory machine readable medium comprising instructions that, when executed, cause a user equipment (UE) to:
   receive a composite signal comprising an interferer transmission from an interferer cell configured to output at least an interferer signal and a target transmission from a target cell configured to output a target signal; and
   compute a cell search metric associated with the target cell, wherein the cell search metric is based at least in part on a cross-correlation between the interferer transmission and the target transmission and one or more of the power of the interferer cell and a power ratio of the interferer cell and the target cell, wherein computing the cell search metric comprises:
   generating the cell search metric proportional to a search criterion by performing a cross-correlation of a target synchronization signal with the received composite signal, wherein the target transmission comprises the target synchronization signal, and wherein the interferer transmission comprises an interferer synchronization signal, wherein the target synchronization signal comprises a target primary synchronization signal and a target secondary synchronization signal, wherein the interferer synchronization signal comprises an interferer primary synchronization signal and an interferer secondary synchronization signal; and generating an equivalent ideal metric proportional to the search criterion by modifying the cell search metric according to the cross-correlation between the interferer transmission and the target transmission to suppress a component of the interferer signal within the cell search metric, wherein the equivalent ideal metric identifies the target signal in light of the interferer signal, wherein generating the equivalent ideal metric comprises:

generating a primary equivalent ideal metric based on a cross-correlation of the target primary synchronization signal and the interferer primary synchronization signal;

generating a secondary equivalent ideal metric based on a cross-correlation of the target secondary synchronization signal and the interferer secondary synchronization signal; and combining the primary equivalent ideal metric and the secondary equivalent ideal metric to obtain the equivalent ideal metric.

2. The non-transitory machine readable medium of claim 1, wherein the cell search metric comprises the reference signal received power (RSRP) or reference signal received quality (RSRQ).

3. The non-transitory machine readable medium of claim 1, wherein the cell search or measurement metric comprises a received signal strength or power that is proportional to a channel strength or power from a cell to a user equipment.

4. A non-transitory machine readable medium comprising instructions that, when executed, cause a user equipment (UE) to:

receive a composite signal comprising transmissions from a plurality of cells that comprise a target cell and an interferer cell;

generate metrics proportional to a search criterion for the plurality of cells based upon a cross-correlation between transmissions from the plurality of cells and the received composite signal, wherein at least one of the metrics is based at least in part on one or more of a cross-correlation between an interferer transmission of the interferer cell and a target transmission of the target cell, the power of the interferer cell, and a power ratio of the interferer cell and the target cell, wherein generating the at least one of the metrics comprises:

generating the at least one of the metrics proportional to a search criterion by performing a cross-correlation of a target synchronization signal with the received composite signal, wherein the target transmission comprises the target synchronization signal, and wherein the interferer transmission comprises an interferer synchronization signal, wherein the target synchronization signal comprises a target primary synchronization signal and a target secondary synchronization signal, wherein the interferer synchronization signal comprises an interferer primary synchronization signal and an interferer secondary synchronization signal; and generating an equivalent ideal metric proportional to the search criterion by modifying the at least one of the metrics according to the cross-correlation between the interferer transmission and the target transmission to suppress a component of the interferer signal within the cell search metric, wherein the equivalent ideal metric identifies the target signal in light of the interferer signal, wherein generating the equivalent ideal metric comprises:

generating a primary equivalent ideal metric based on a cross-correlation of the target primary synchronization signal and the interferer primary synchronization signal;

generating a secondary equivalent ideal metric based on a cross-correlation of the target secondary synchronization signal and the interferer secondary synchronization signal; and combining the primary equivalent ideal metric and the secondary equivalent ideal metric to obtain the equivalent ideal metric; and selecting a subset of the plurality of cells having a strongest signal according to the search criterion by comparing the metrics of the plurality of cells.

5. The non-transitory machine readable medium of claim 4, wherein the interferer synchronization signal and the target synchronization signal overlap in time.

6. The non-transitory machine readable medium of claim 5, wherein selecting a subset of the plurality of cells comprises comparing equivalent ideal metrics of the cells.

7. The non-transitory machine readable medium of claim 6, wherein the search criterion comprises a synchronization signal received power (SCH_RP) proportional to a received linear average power of resource elements that carry a secondary synchronization signal.

8. The non-transitory machine readable medium of claim 7, wherein modifying the at least one of the metrics comprises subtracting a component contributed by the interferer transmission.

9. The non-transitory machine readable medium of claim 7, wherein modifying the at least one of the metrics comprises multiplying the correlation-based metric of the target signal with a weighting factor that suppresses the influence of the interferer transmission.

10. The non-transitory machine readable medium of claim 9, wherein the weighting factor is inversely proportional to the ratio of a synchronization signal received power of the interferer transmission to a synchronization signal received power of the target transmission.

11. The non-transitory machine readable medium of claim 4, further comprising: performing a Fourier transform on the received composite signal prior to generating the metrics.

12. A wireless communication apparatus, comprising:

an RF interface configured to receive a composite signal comprising a plurality of transmissions, respectively broadcast by a plurality of communication cells comprising at least an interferer cell configured to broadcast at least an interferer signal and a target cell configured to broadcast a target signal; and a cell search element configured to generate a metric proportional to a search criterion for the plurality of communication cells, wherein the metric is based at least in part upon a cross-correlation between the interferer signal and the target signal, wherein the cell search element generates the metric proportional to a search criterion by performing a cross-correlation of a target synchronization signal with the received composite signal, wherein the target transmission comprises the target synchronization signal, and wherein the interferer transmission comprises an interferer synchronization signal, wherein the target synchronization signal comprises a target primary synchronization signal and a target secondary synchronization signal, wherein the interferer synchronization signal comprises an interferer primary synchronization signal and an interferer secondary synchronization signal, wherein the cell search element generates an equivalent ideal metric proportional to the search criterion by modifying the metric according to the cross-correlation between the interferer transmission and the target transmission to suppress a component of the interferer signal within the cell search metric, wherein the equivalent ideal metric identifies the target signal in light of the interferer signal, and wherein the cell search element generates a primary equivalent ideal metric based on a cross-correlation of the target primary synchronization signal and the interferer primary synchronization signal, generates a secondary equivalent ideal metric based on a cross-correlation of the target secondary synchronization signal and the interferer secondary synchronization signal, and combines the primary equivalent ideal metric and the secondary equivalent ideal metric to obtain the equivalent ideal metric.

13. The apparatus of claim 12, wherein the equivalent ideal metric is the metric.

14. The apparatus of claim 13, wherein the cell search element further comprises:
 a first logic element configured to perform a maximum search on the primary equivalent ideal metric and to determine a first subset of the plurality of communication cells that are broadcasting PSS with the strongest signals according to the search criteria; and
 a second logic element configured to perform a maximum search on the secondary equivalent ideal metric and to determine a second subset of the plurality of communication cells that are broadcasting SSS with the strongest signals according to the search criteria.

15. The apparatus of claim 14, wherein the cell search element further comprises:
 a combining and selection unit configured to receive the first subset and the second subset and to select the subset of the plurality of communication cells therefrom.

* * * * *